United States Patent
Shimada et al.

(10) Patent No.: US 6,514,619 B2
(45) Date of Patent: Feb. 4, 2003

(54) AQUEOUS RESIN COMPOSITION AND COATED METAL MATERIAL HAVING CURED COATING OF THE SAME

(75) Inventors: Hiroaki Shimada, Saitama (JP); Takashi Kojima, Tokyo (JP); Yoshihiro Yamano, Tokyo (JP); Yoshiki Itoh, Saitama (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 09/938,733

(22) Filed: Aug. 27, 2001

(65) Prior Publication Data

US 2002/0049262 A1 Apr. 25, 2002

(30) Foreign Application Priority Data

Aug. 30, 2000 (JP) ........................... 2000-260760

(51) Int. Cl.$^7$ ............................... B32B 75/08
(52) U.S. Cl. .................. 428/418; 523/406; 523/407; 523/409; 523/412; 525/329.7; 525/330.2
(58) Field of Search ................ 523/406, 407, 523/409, 412; 525/329.7, 330.2; 428/418

(56) References Cited

U.S. PATENT DOCUMENTS

| 4,021,358 A | | 5/1977 | Tomono |
|---|---|---|---|
| 4,455,361 A | | 6/1984 | Narusawa |
| 6,046,256 A | * | 4/2000 | Nakamura et al. .......... 523/404 |

FOREIGN PATENT DOCUMENTS

| EP | 0 303 211 A2 | | 2/1989 |
|---|---|---|---|
| JP | A-53-1228 | | 1/1978 |
| JP | A-55-3481 | | 1/1980 |
| JP | A-55-3482 | | 1/1980 |
| JP | A-55-75460 | | 6/1980 |
| JP | A-56-109243 | | 8/1981 |
| JP | A-57-105418 | | 6/1982 |
| JP | A-58-198513 | | 11/1983 |
| JP | A-4-351682 | | 12/1992 |
| JP | A-8-302275 | | 11/1996 |
| JP | A-9-169948 | | 6/1997 |
| JP | A-9-227824 | | 9/1997 |
| JP | A-11-181349 | | 7/1999 |
| JP | A-11-199827 | | 7/1999 |
| WO | WO98/06782 | * | 2/1998 |

OTHER PUBLICATIONS

Database WPI Section Ch,. Week 198346 Derwent Publications Ltd., London, GB; AN 1983–817572 XP 002192335 & JP 58 171060 A (Tomoegawa Paper), Oct. 7, 1983 * Abstract *.
Database WPI Section Ch, Week 198427 Derwent Publications Ltd., London, GB; AN 1984–167752 XP002192336 & JP 59 090863 A (Konishiroku) May 25, 1984 * Abstract *.
Patent Abstracts of Japan vol. 010, No. 041, Feb. 18, 1986 & JP 60 188958 A (Sumitomo Kagaku) Sep. 26, 1985 * Abstract *.

* cited by examiner

Primary Examiner—Robert Dawson
Assistant Examiner—D. Aylward
(74) Attorney, Agent, or Firm—Armstrong, Westerman & Hattori, LLP

(57) ABSTRACT

An aqueous resin composition comprising prepared by a process comprising the steps of: reacting epoxy resins comprising: (A) an aromatic epoxy resin having a number average molecular weight of at least 9,000 and an epoxy equivalent of not larger than 9,000; and (B) an aromatic epoxy resin having a number average molecular weight of less than 9,000 and an epoxy equivalent of not larger than 5,000, and (C) a carboxyl group-containing acrylic resin having a glass transition temperature of at least 100° C., to undergo partial-esterification to obtain an acryl-modified epoxy resin; neutralizing said acryl-modified epoxy resin with a base and dispersing the neutralized resin in an aqueous medium. Also disclosed is a coated metal material having a cured coated film of the aqueous resin composition.

10 Claims, No Drawings

AQUEOUS RESIN COMPOSITION AND COATED METAL MATERIAL HAVING CURED COATING OF THE SAME

FIELD OF THE INVENTION

The present invention relates to an aqueous resin composition excellent in adhesion and corrosion resistance and also relates to a coated metal material coated with the aqueous resin composition and having a cured coated film excellent in adhesion to the surface of the metal material and also excellent in corrosion resistance, flexibility, and can end opening properties.

BACKGROUND OF THE INVENTION

Hitherto, as metal can materials, metals such as aluminum, tin plate, tin-free steel, etc., have been used. In the case of using these metals as cans, a coated film is usually formed on the inside and outside surfaces of cans for preventing the occurrence of corrosion. As a coating material for the inside surfaces of cans, coating materials of an epoxy/phenol resin-base, an epoxy/amino resin-base, or of a vinyl chloride organosol-base have usually been used because of being excellent in the points of adhesion and corrosion resistance.

However, the coating materials as described above contain organic solvents and thus have particularly possibilities of causing air pollution and deteriorating working atmosphere as well as the danger of causing a fire and an explosion. Of these coating materials, since the vinyl chloride organosol-base coating material was pointed out as being a possible generating source of dioxins, the activity of avoiding the use of vinyl chloride resin has been quickly accelerated. In view of the circumstances, there have been variously proposed, as means for avoiding these problems, methods of dispersing in water a so-called self-emulsifiable epoxy resin obtained by introducing a segment having an emulsifying force into the molecule by modifying an epoxy resin with an acrylic resin.

For example, JP-A-53-1228 (The term "JP-A" as used herein means an "unexamined published Japanese patent application") discloses a method of stably dispersing, into an aqueous medium containing a base, a grafted epoxy resin obtained by polymerizing a monomer mixture containing a carboxyl group-containing vinyl monomer using a free radical generating agent such as benzoyl peroxide, etc., in the presence of an epoxy resin.

JP-A-55-75460 and JP-A-56-109243 each discloses a method of dispersing, into an aqueous medium in the presence of ammonia or an amine, a partial reaction product having excessive carboxyl groups obtained by reacting an acrylic resin and an aromatic epoxy resin having a relatively high molecular weight.

JP-A-55-3481 and JP-A-55-3482 each discloses a method of neutralizing, with a base, a carboxyl group-containing vinyl polymer-modified epoxy resin substantially having no oxirane group of an epoxy resin, which is obtained by esterifying a carboxyl group-containing vinyl polymer with an epoxy resin in the presence of an amine-base esterification catalyst, and dispersing the neutralized product in water.

Furthermore, JP-A-57-105418 and JP-A-58-198513 each discloses a method of copolymerizing: a low molecular weight compound having an epoxy group and an acryloyl group in one molecule, obtained by partially reacting an aromatic epoxy group and (meth)acrylic acid; and a monomer mixture containing acrylic acid or methacrylic acid, and neutralizing the copolymer with a base to disperse in water.

These aqueous resin compositions are excellent in the point of general food hygiene, but on the other hand, when the resin compositions are used for particularly a can end, it is difficult to simultaneously satisfy the opening property of the can end and the processing corrosion resistance. In addition, opening of a can end is carried out by pulling up the tab portion of a pull top tab or a stay-on-tab of the can end, but there can occur the phenomenon that the coated film is not cut along the score portion and a part of the coated film remains at the open portion, and in the worst case, the can end cannot be opened. Such characteristics of the can end is called can end opening properties.

Recently, JP-A-4-351682 discloses an aqueous resin composition using a bisphenol F-type epoxy resin for improving particularly the opening property of a can end, wherein a carboxyl group-containing self emulsifiable epoxy resin is dispersed in an aqueous medium. Also, JP-A-9-169948 and JP-A-11-181349 disclose, for the purpose of use for ends, methods of modifying an epoxy resin, obtained by copolymerizing a bisphenol A-type epoxy resin and a bisphenol F-type epoxy resin, with a carboxyl group-containing acrylic resin, and neutralizing the modified epoxy resin with a base to disperse in water. Also, JP-A-11-199827 discloses a method of using a mixture of a bisphenol A-type epoxy resin and a bisphenol F-type epoxy resin. As can be seen from these inventions, by using a bisphenol F-type epoxy resin, the opening property can be improved to some extent. However, there occurs a problem that owing to the deformation (doming) of a can end caused by a sterilizing process after filling a high carbonated beverage, microcracks, which are fine cracks of a coated film, generate and from the cracks, a corrosion proceeds. The performance of a coating film, which does not cause the microcracks and the corrosion accompanied therewith even with respect to such a deformation of an end, is called secondary processing corrosion resistance.

JP-A-8-302275 discloses an aqueous resin dispersion comprising an acryl-modified epoxy resin and an acrylic resin containing at least 40% of an acrylic monomer, a homopolymer of which has a glass transition temperature of not higher than 0° C. However, when a mono-basic carboxylic acid monomer is not substantially used in the acrylic resin containing at least 40% of the acrylic monomer component, a homopolymer of which has a glass transition temperature of not higher than 0° C., even by adding this acrylic resin to the acryl-modified epoxy resin and neutralizing it with an amine, etc., in order to disperse the resin in an aqueous medium, the acrylic resin is separated and becomes a graininess form, whereby the acrylic resin cannot stably exist in the aqueous resin dispersion. Also, even when a mono-basic carboxylic acid monomer is used in the acrylic acid, the acrylic acid reacts with the acryl-modified epoxy resin at baking to become compatible with the epoxy resin. Therefore, although the improving effect for the secondary processing corrosion resistance at an external shocked portion may be obtained a little, there is a large problem that the opening property of the can end cannot be improved, which is another important problem.

Furthermore, JP-A-9-227824 discloses an aqueous coating material composition obtained by mixing an aqueous dispersion of a carboxyl group-containing modified epoxy resin and an emulsion resin obtained by emulsion polymerizing an ethylenically unsaturated monomer in the presence of an aqueous dispersion of a carboxyl group-containing acrylic resin. However, such a technique has a problem that satisfactory excellent opening property of the can end and secondary processing corrosion resistance cannot be attained unless the ethylenically unsaturated monomer is appropriately selected paying attention to the glass transition temperature of its homopolymer and an attempt is made so that the particle sizes of the emulsion resin made of the ethylenically unsaturated monomer is optimized and homogenized.

In addition, the above-described publication merely discloses coated film properties as for the aqueous resin compositions for can coating and does not mention about the application property. In spite of that the application property for coating resin compositions for can coating on metal materials, in the case of particularly an aqueous dispersion, has importance as high as or higher than the coated film properties in certain meanings, there has been no proper means for controlling flowability to the present.

As described above, it is the actual circumstances that as an aqueous resin composition for can coating, particularly, a coating material for the inside surface of a can end, it has not yet been found an aqueous resin composition which is excellent in the food hygiene and the flavor retentivity, is also excellent in the flexibility, the corrosion resistance, the secondary processing corrosion resistance to the deformation (doming) of a can end after filling a high carbonated beverage, and the opening property, and which is also excellent in the application property.

SUMMARY OF THE INVENTION

An object of the present invention is to provide an aqueous resin composition capable of forming a cured coating film which is excellent in adhesion to the surface of a metal material, corrosion resistance, flexibility, can end opening property and application property.

Another object of the present invention is to provide a coated metal material having the above-described cured film which is useful as an interior coating of a can.

Other objects and effects of the present invention will be apparent from the following description.

As the result of extensive investigations, the present inventors have found that the above-described problems can be solved by an aqueous resin composition using a specific epoxy resin and a specific acrylic resin. The present invention is based on this finding.

That is, the above-described objects of the present invention have been achieved by providing the following aqueous resin compositions and coated metal materials.

1) An aqueous resin composition comprising prepared by a process comprising the steps of:
   reacting epoxy resins comprising: (A) an aromatic epoxy resin having a number average molecular weight of at least 9,000 and an epoxy equivalent of not larger than 9,000; and (B) an aromatic epoxy resin having a number average molecular weight of less than 9,000 and an epoxy equivalent of not larger than 5,000, and (C) a carboxyl group-containing acrylic resin having a glass transition temperature of at least 100° C., to undergo partial-esterification to obtain an acryl-modified epoxy resin;
   neutralizing said acryl-modified epoxy resin with a base; and
   dispersing the neutralized acryl-modified epoxy resin in an aqueous medium.

2) The aqueous resin composition according to item 1) above, wherein said aromatic epoxy resin (A) is a bisphenol A epoxy resin or a bisphenol B epoxy resin, and said aromatic epoxy resin (B) is a bisphenol F epoxy resin.

3) The aqueous resin composition according to item 1) above, wherein said aromatic epoxy resin (A) is a bisphenol A epoxy resin or a bisphenol B epoxy resin, and said aromatic epoxy resin (B) is a bisphenol A epoxy resin or a bisphenol B epoxy resin.

4) The aqueous resin composition according to any one of items 1) to 3) above, having a content ratio of said aromatic epoxy resin (A) to said aromatic epoxy resin (B) of from 95/5 to 75/25 by weight.

5) The aqueous resin composition according to any one of items 1) to 4) above, wherein said carboxyl group-containing acrylic resin (C) has a number average molecular weight of from 2,000 to 10,000.

6) The aqueous resin composition according to claim any one of items 1) to 5) above, wherein the weight ratio (((A)+(B))/(C)), in terms of non-volatile components, of said aromatic epoxy resin (A) and said aromatic epoxy resin (B) to said carboxyl group-containing acrylic resin (C) is from 80/20 to 90/10.

7) The aqueous resin composition according to any one of items 1) to 6) above, further comprising particles of an acrylic resin (D) having a glass transition temperature of not higher than 0C and being incompatible with said acryl-modified epoxy resin.

8) The aqueous resin composition according to item 7) above, having a content ratio of said acryl-modified epoxy resin to said particles of acrylic resin (D) of from 99/1 to 80/20 by weight.

9) A coated metal material comprising a metal material having on the surface thereof a cured film formed by curing a coating of an aqueous resin composition according to any one of items 1) to 8) above.

10) The coated metal material according to item 9) above, wherein said cured coated film has dispersed particles of an acrylic resin (D) having a glass transition temperature of not higher than 0° C. and being incompatible with said acryl-modified epoxy resin, said dispersed particles having an average particle size of from 0.1 to 2.0 μm.

By the above-described means, an aqueous resin composition excellent in corrosion resistance and adhesion to the surface of a metal material, and a coated metal material having a cured film formed by curing a coating of the aqueous resin composition can be provided.

DETAILED DESCRIPTION OF THE INVENTION

The aqueous resin composition of the present invention is an aqueous resin composition formed by neutralizing, with an amine, the acryl-modified epoxy resin obtained by partial esterification reaction of the epoxy resins comprising the above-described aromatic epoxy resin (A) and the above-described aromatic epoxy resin (B) with the above-described carboxyl group-containing acrylic resin (C) and dispersing the neutralized acryl-modified epoxy resin in an aqueous medium. As the uses thereof, the aqueous resin composition can be used not only as a coating material for various metal materials or products of, for example, aluminum, tin-plated steel sheets, pre-treated metals, and steels, but also as a coating agent for other materials and processed goods, such as woods. Particularly, the aqueous resin composition can expect an excellent effect when used as an interior coating of a can. Furthermore, when the aqueous resin composition contains the particles of the above-described acrylic resin (D) having a Tg of not higher than 0° C. and having no compatibility with the above-described acryl-modified epoxy resin, the aqueous resin composition gives the specifically excellent effect as an interior coating of a can end which is applicable to beverages having a strong corrosive property.

Aromatic Epoxy Resin (A)

The aromatic epoxy resin (A) used for the aqueous resin composition of the invention is an epoxy resin having a number average molecular weight of at least 9,000 and an epoxy equivalent of not larger than 9,000. The number average molecular weight is measured by a gel permeation chromatography (GPC) and calculated by a polystyrene conversion. The epoxy equivalent is the value obtained by the reciprocal of the epoxy value, which is the value showing the amount of the epoxy group existing in 100 g of an epoxy resin, multiplied by 100.

The number average molecular weight of the aromatic epoxy resin (A) is preferably from 9,000 to 18,000, and more preferably from 10,000 to 15,000 from the points of the flexibility and the adhesion. The epoxy equivalent of the aromatic epoxy resin (A) is preferably from 6,000 to 9,000 from the view points of the curing property and the prevention of the coated film whitening phenomenon after a hot water process.

As the aromatic epoxy resin (A), any one of bisphenol A-type epoxy resins, bisphenol B-type epoxy resins and bisphenol F-type epoxy resins can be used, but for the use of interior coating of a can end, bisphenol A-type epoxy resins and bisphenol B-type epoxy resins are preferred from the point of improving the secondary processing corrosion resistance.

The commercially available products thereof include, for example, Epikote 1256 manufactured by Yuka Shell Epoxy Corporation, ZX-1449-8 manufactured by Toto Kasei K.K., etc.

Aromatic Epoxy Resin (B)

The aromatic epoxy resin (B) used for the aqueous resin composition of the invention is an epoxy resin having a number average molecular weight of less than 9,000 and an epoxy equivalent of not larger than 5,000. The range of the aromatic epoxy resin (B) is preferably from 4,000 to 8,000 from the points of the flexibility and the adhesion.

It is necessary that the aromatic epoxy resin (B) has the epoxy equivalent is not higher than 5,000 for sufficiently forming an acryl-epoxy graft material, having a function of an emulsifying agent of dispersing a water-insoluble epoxy resin in water, by the esterification reaction with the carboxyl group-containing acrylic resin (C) to obtain a stable aqueous dispersion having a proper flow characteristics. On the other hand, from the view points of the proper curing property and the flexibility attributed to the molecular weight, it is preferred that the epoxy equivalent of the aromatic epoxy resin (B) is larger than 2,000.

As the aromatic epoxy resin (B), any of bisphenol A-type epoxy resins, bisphenol B-type epoxy resins and bisphenol F-type epoxy resins can be used. However, it is desired that they can be selected depending on the intended use. That is, for the use in a thin coated film, bisphenol A-type epoxy resins and bisphenol B-type epoxy resins can also be used. However, for the use in a thick coated film for a beverage having a weak corrosive property, it is preferred to use a bisphenol F-type epoxy resin which is effective in opening property as the results of lowering the internal stress and increasing adhesion to the base material.

In the case of a thick coated film for a beverage of a strong corrosive property, particularly when a bisphenol F-type epoxy resin is used for the use, there is a tendency that microcracks are formed in the coated film and the secondary processing corrosion resistance is inferior owing to the deformation (hereinafter, is referred to as doming) of the can end caused by a sterilization process after filling a high carbonated beverage. The secondary processing corrosion resistance tends to be deteriorated as the increase of the amount of the bisphenol F-type epoxy resin. Therefore, for the use of filling a high carbonated beverage, it is preferred for the aromatic epoxy resin (B) to reduce the use amount of a bisphenol F-type epoxy resin as small as possible and to use a bisphenol A-type epoxy resin or a bisphenol B-type epoxy resin.

The commercially available products thereof include, for example, Epikotes 1009, 1010, 4009P, and 4010P manufactured by Yuka Shell Epoxy Corporation, ZX1462, YD909, and YD7909, manufactured by Toto Kasei K.K., etc.

The content ratio of the aromatic epoxy resin (A) and the aromatic epoxy resin (B), which are used for the aqueous resin composition of the invention, is preferably from 95/5 to 75/25 by weight. For obtaining the good flexibility, it is preferred that the content of the aromatic epoxy resin (B) is not more than 25% by weight. On the other hand, for obtaining the number of functional groups necessary for the esterification reaction, for controlling the flowability of the aqueous resin composition, for maintaining the adhesive force, and for obtaining a good opening property, the content of the aromatic epoxy resin (B) is preferably at least 5% by weight.

The carboxyl group-containing acrylic resin (C), which is used for the aqueous resin composition of the invention, is a carboxyl group-containing acrylic resin having a Tg of at least 100° C. obtained by copolymerizing a copolymerizable monomer mixture, containing an ethylenically unsaturated carboxylic acid as an essential component, in an organic solvent. Particularly typical examples of the ethylenically unsaturated carboxylic acid include (meth)acrylic acid, crotonic acid, itaconic acid, maleic acid, and fumaric acid.

The above-described ethylenically unsaturated carboxylic acid also includes monoalkyl esters of various kinds of ethylenically unsaturated dicarboxylic acids, such as monomethyl maleate, monoethyl fumarate, mono-n-butyl itaconate, etc.

Other copolymerizable monomers include so-called radical polymerizable compounds, for example, various (meth) acrylic acid esters such as methyl (meth)acrylate, ethyl (meth)acrylate, propyl (meth)acrylate, butyl (meth)acrylate, pentyl (meth)acrylate, hexyl (meth)acrylate, 2-ethylhexyl (meth)acrylate, heptyl (meth)acrylate, octyl (meth)acrylate, octadecyl (meth)acrylate, etc.; various ethylenically unsaturated aromatic monomers (aromatic vinyl monomers), such as styrene, α-methylstyrene, vinyltoluene, chlorostyrene, 2,4-dibromostyrene, etc.; various ethylenically unsaturated nitriles such as (meth)acrylonitrile, etc.; various vinyl esters such as vinyl acetate, vinyl propionate, etc.; various vinylidene halides such as vinylidene chloride, vinylidene bromide, etc.; various ethylenically unsaturated hydroxyalkyl esters such as 2-hydroxyethyl acrylate, 2-hydroxypropyl acrylate, 2-hydroxyethyl acrylate, etc.; various ethylenically unsaturated carboxylic acid glycidyl esters such as glycidyl (meth)acrylate, etc.; and various (meth)acrylamide derivatives such as (meth)acrylamide, N-methylol (meth)acrylamide, N-butoxymethyl acrylamide, etc.

For obtaining the carboxyl group-containing acrylic resin (C), the above-described various copolymerizing monomers can be used. It is sufficient for the acrylic resin (C) that its theoretical Tg obtained by the calculation is at least 100° C., but it is particularly preferred that the content of the monomer having an ester bond and having a Tg of its homopolymer of not higher than 27° C. (hereinafter, is referred to as a specific ester-type monomer) in the carboxyl group-containing acrylic resin (C) is within 2% by weight. This is because when the aqueous resin composition of the invention is used for an interior coating of a can, there are tendencies that resin components having a low Tg absorb a large amount of flavor components of the contents, increase steam permeability, and furthermore that the ester bond is hydrolyzed in the heat sterilizing process of the contents in the can to greatly deteriorate the flexibility. The above-described specific ester-type monomer includes acrylic esters such as ethyl acrylate, propyl acrylate, butyl acrylate, 2-ethylhexyl acrylate, etc.

The carboxyl group-containing acrylic resin (C) can be obtained by copolymerizing a mixture of the above-described ethylenically unsaturated carboxylic acid and other polymerizable monomers in, for example, an organic solvent by heating to a temperature of from 80 to 150° C. for about 1 to 10 hours in the presence of a radical polymerization initiator or a chain-transfer agent. There is no particular restriction on the use amount of the polymerization initiator but is preferably in the range of from 0.01 to 20% by weight based on the total weight of the copolymerizable monomers.

As the above-described polymerization initiator, organic peroxide-base compounds, azo-base compounds, etc., are used. The organic peroxide-base compounds include benzoyl peroxide, t-butylperoxy 2-ethylhexanoate, di-t-butyl peroxide, t-butylperoxy benzoate, t-amylperoxy 2-ethylhexanoate, etc. Also, the azo-base compounds include, for example, azobisisobutyronitrile, azobisdimethylvaleronitrile, etc.

The above-described chain-transfer agent includes an α-methylstyrene dimer, mercaptan, etc.

The number average molecular weight of the carboxyl group-containing acrylic resin (C) is preferably in the range of from 2,000 to 10,000 and more preferably from 3,000 to 8,000 for obtaining a stable aqueous dispersion of the acryl-modified epoxy resin and good flexibility of the coated film.

The use amount of the ethylenically unsaturated carboxylic acid in the above-described production method is preferably from 25 to 65 parts by weight per 100 parts by weight of the total amounts of the copolymerizable monomers for improving dispersion stability of the resin in the aqueous medium, adhesion of the coated film to a metal, solvent resistance, hygiene in the case of using for the inside surface of the can, etc.

The aqueous dispersion of the acryl-modified epoxy resin used for the aqueous resin composition of the invention can be easily obtained by partially esterification reacting the aromatic epoxy resin (A) and the aromatic epoxy resin (B) with the carboxyl group-containing acrylic resin (C) in an organic solvent in the presence of an amine catalyst at a reaction group concentration that the carboxyl groups are excessive to the epoxy groups, neutralizing the reaction product with an amine, and dispersing the neutralized product in an aqueous medium. There is no particular restriction on the amine catalyst but dimethylethanolamine can be suitably used.

During the esterification reaction, the resin acid value, the epoxy equivalent, the resin viscosity, etc., are tracked, and when they reach the predetermined acid value, epoxy equivalent, viscosity, etc., an amine and water are added to the reaction system to stop the esterification reaction, and the reaction mixture is dispersed in an aqueous medium, whereby the aqueous dispersion of the acryl-modified epoxy resin having an arbitral flowability can be easily obtained. In other words, when the esterification reaction is proceeded and the amount of an acryl-epoxy graft product is increased, the extent of a pseudo-plasticity becomes large, while when the esterification is suppressed, the aqueous dispersion of the acryl-modified epoxy resin having a small extent of the pseudo-plasticity can be obtained.

The flowability can be easily expressed by measuring the relation of the viscosity to the shear velocity using a rheometer and by substituting for the Harshal-Barkley's approximate formula, to thereby determine a coefficient C, which is an index of the pseudo-plasticity flow. When the C value is 1, the flowability generally shows the Newtonian flow, which is shown by a solvent-type coating material, and as the numeral value becomes smaller, the fluid becomes a pseudo-plasticity fluid of a large pseudo-plasticity. In the case of aqueous dispersions of acryl-modified epoxy resins, in general, when a high molecular weight epoxy resin having less epoxy groups is used, the C value approaches 1. On the other hand, when the epoxy resin has many epoxy groups, an aqueous dispersion having a large extent of the pseudo-plasticity is formed. However, it has been difficult to arbitrarily control the pseudo-plasticity.

When the acryl-modified epoxy resin used for the aqueous resin composition of the invention is synthesized, the partial esterification reaction is carried out such that epoxy groups are remains. In this regard, it is possible to obtain microgel particles having a three-dimensional network structure by, after neutralizing at least a part of the carboxyl groups in the acryl-modified epoxy resin used in the invention with a basic compound and dispersing in an aqueous medium, heating the acryl-modified epoxy resin dispersion, so as to proceed the reaction of the epoxy group and the carboxyl group remaining in the fine dispersion particles. In other words, because the molecular weight of the acryl-modified epoxy resin itself becomes a super high molecule weight to the extent of containing microgels, the baking conditions can be a low temperature and a short time. Thus, the energy can be saved and the productivity can be improved.

As for the use amount ratios of the aromatic epoxy resin (A), the aromatic epoxy resin (B) and the carboxy group-containing acrylic resin (C) in the above-described production method, the ratio of ((A)+(B))/(C) is preferably from 80/20 to 90/10 in terms of the non-volatile component weight ratio with regarding the total weights of component (A), (B) and (C) as being 100 parts by weight. In addition, the reaction group concentration range that the carboxyl group becomes excessive to the epoxy group is preferred. The use amount proportion of the carboxy group-containing acrylic resin (C) is preferably at least 10 for obtaining a good dispersion stability to water and sufficiently proceeding the curing reaction of the epoxy resin at baking, and also is preferably not higher than 20 for attaining excellent adhesion of the coated film to a metal and good flexibility.

The organic solvent which can be used in the invention includes methanol, ethanol, n-propanol, iso-propanol, n-butanol, sec-butanol, tert-butanol, iso-butanol, methyl cellosolve, ethyl cellosolve, propyl cellosolve, butyl cellosolve, ethyl carbitol, butyl carbitol, methyl cellosolve acetate, ethyl cellosolve acetate; various hydrophilic organic solvents such as dioxane, dimethylformamide and diacetone alcohol; and various lipophilic organic solvents such as ethyl acetate, methyl ethyl ketone, methyl isobutyl ketone, cyclohexanone, toluene and xylene. These solvents may be used singly or as a mixture of two or more kinds thereof, and if necessary, these organic solvents may be used together with water.

The basic compound, which can be used for the neutralization of the carboxyl group of the acryl-modified epoxy resin obtained by the above-described method, includes ordinary ammonia and organic bases.

The organic bases, which can be used, include alkylamines such as trimethylamine, triethylamine, butylamine, etc.; alcoholamines such as dimethylethanolamine, diethylisopropanolamine, diethanolamine, aminomethyl propanol, etc.; and morpholine, etc. Also, polyvalent amines such as ethylenediamine, diethylenetriamine, etc., can be also used.

As the above-described basic compounds, dimethylethanolamine is preferred because it does not remain in the coated film and has a tendency of improving the water resistance of the coated film. As for the use amount of the basic compound, the amount that the pH of the aqueous dispersion becomes at least 5 is preferred.

The aqueous medium used for the aqueous resin composition of the invention means water alone or a mixture of water and a hydrophilic organic solvent in which at least 10% by weight is water. The hydrophilic organic solvent, which can be used herein, include alkyl alcohols such as methanol, ethanol, n-propanol, iso-propanol, n-butanol, sec-butanol, tert-butanol, iso-butanol, etc.; glycol ethers such as methyl cellosolve, ethyl cellosolve, propyl cellosolve, butyl cellosolve, hexyl cellosolve, methyl carbitol, ethyl carbitol, butyl carbitol, etc.; and glycol ether esters such as methyl cellosolve acetate, ethyl cellosolve acetate, etc. Furthermore, as other organic solvents, which can be used in the invention, there are dioxane, dimethylformamide, tetrahydrofuran, methyl ethyl ketone, diacetone alcohol, etc.

If necessary, a lipophilic organic solvent can be used in the invention without any hindrance. In the case where it is necessary to reduce the organic solvent contained in the aqueous resin composition thus obtained, an aqueous resin composition having a low content of the organic solvent can be stably and easily obtained by using an organic solvent, which has a low boiling point and forms an azeotrope with water, such as, for example, acetone, methyl ethyl ketone, n-butanol, and butyl cellosolve, in combination with water upon the production of the acryl-modified epoxy resin to thereby disperse the organic solvent in the aqueous medium and then distilling at normal pressure or a reduced pressure.

The aqueous resin composition of the invention is an aqueous resin composition formed by partial esterification reacting the epoxy resin comprising the aromatic epoxy resin (A) and the aromatic epoxy resin (B) with the carboxyl-containing acrylic resin (C) in an organic solvent, neutralizing the thus obtained acryl-modified epoxy resin with an amine and dispersing in an aqueous medium. Furthermore, when the aqueous resin composition contains the particles of the above-described acrylic resin (D), which has a Tg of not higher than 0° C. and does not have a compatibility with the above-described acryl-modified epoxy resin, the resulting aqueous resin composition shows the specifically excellent effect especially for interior coating of a can end.

The acrylic resin (D) preferably gives its dispersed particle size existing in the cured coated film of at least 0.1 μm for obtaining sufficient adhesion. The dispersed particle size is preferably not larger than 2 μm for obtaining better secondary processing corrosion resistance. It is more preferred that the dispersed particle size thereof is from 0.5 to 1 μm. In the case of using the composition as an interior coating of a can end, a coated metal material having an excellent opening property by an especially high adhesive force can be provided so long as the dispersed particle size of the acrylic resin (D) in the cured coated film is within the above range.

The content ratio of the acrylic rein (D) to the acryl-modified epoxy resin is preferably from 99/1 to 80/20 by weight. That is, the proportion of the acrylic resin (D) is preferably at least 1 for obtaining good adhesion and good secondary processing corrosion resistance, and also is preferably not higher than 20 for obtaining good flexibility. The above described addition amount range is particularly effective for the improvement of the opening property and for the improvement of the secondary processing corrosion resistance.

The particle size of the acrylic resin (D) is obtained by slicing thinly the cured coated film, directly observing the particles of the acrylic resin (D) in the cured coated film by an electron microscope, and measuring the particle size distribution by an image analysis soft, and is a median size. When the cured coated film of the aqueous resin composition of the invention is thinly sliced and is observed under an electron microscope, it can be seen that the resin composition has the structure wherein the resin component made of the acrylic resin (D) is dispersed in an island form in the resin component made of the acrylic-modified epoxy resin. The carboxyl group-containing acrylic resin (C), which is used in the production of the acryl-modified epoxy resin that becomes a sea component, should have a Tg of at least 100° C. for suppressing the absorbing amount of the flavor component. In contrast, even when the Tg of the acrylic resin (D) is low, the acrylic resin forming the island component provides less absorbing amount of the flavor component and low steam permeability because of the sea-island structure, and a considerably good coated film can be obtained.

The acrylic resin (D) can be obtained as an aqueous dispersion by a method of selecting a copolymerizable monomer, which becomes incompatible with the acryl-modified epoxy resin and in which the Tg of the copolymer thereof becomes 0° C. or lower, among the same copolymerizable monomers as those used for synthesizing the carboxyl group-containing acrylic resin (C), and carrying out an emulsion polymerization or a method in which after solution polymerization, the resulting polymer is dispersed in water by using an emulsifying agent. It is necessary that the Tg of the acrylic resin (D), in terms of the value obtained from the calculated value, is not higher than 0° C. When the Tg thereof exceeds 0° C., there is a tendency that the effect of improving the secondary processing corrosion resistance to the deformation of the can end is deteriorated.

As a practical example, the above-described acrylic resin (D) can be obtained by copolymerizing a mixture of the above-described ethylenically unsaturated carboxylic acid and other polymerizable monomer in, for example, ion-exchange water, although there is no particular restriction on the aqueous medium, through emulsion polymerization with heating to a temperature of from 70 to 90° C. for from about 1 to 10 hours in the presences of an emulsifying agent and a radical polymerization initiator or a chain transfer agent, or by dispersing using an emulsifying agent, in ion-exchange water, an acrylic resin solution obtained by copolymerizing with heating a mixture of the above-described ethylenically unsaturated carboxylic acid and other polymerizable monomer in, for example, an organic solvent to a temperature of from 80° C. to 150° C. for from about 1 to 10 hours in the presence of a radical polymerization initiator or a chain transfer agent.

As the emulsifying agent, surface active agents such as sodium dioctylsulfosuccinate, sodium dodecylbenzenesulfonate, sodium laurylsulfonate, etc.; or a resin obtained by neutralizing the acidic functional group thereof with a base, such as, for example, a water-soluble resin obtained by neutralizing an acrylic resin having a carboxyl group with an amine can be used.

As the polymerization initiator, organic peroxide-base compounds, azo-base compounds, etc., are used. The organic peroxide-base compounds include benzoyl peroxide, t-butylperoxy 2-ethylhexanoate, di-t-butyl peroxide, t-butylperoxy benzoate, t-amylperoxy 2-ethylhexanoate, etc., and also the azo-base compounds include, for example, azobisisobutyronitrile, azobisdimethylvaleronitrile, etc. Also, as other polymerization initiators, which can be used in the invention, there are ammonium persulfate, sodium persulfate, potassium persulfate, etc. There is no particular restriction on the use amount of the polymerization initiator, but the use amount thereof is preferably in the range of from 0.01 to 20% by weight based on the total weight of the copolymerizing monomers. Examples of the chain transfer agent include an α-methylstyrene dimer, mercaptans, etc.

The aqueous resin composition of the invention containing the particles of the acrylic resin (D) can be obtained by adding the aqueous dispersion of the acrylic resin (D) to the esterification reaction system of the carboxyl group-containing acrylic resin (C), the aromatic epoxy resin (A) and the aromatic epoxy resin (B) in an organic solvent in the presence of an amine catalyst, during the esterification reaction, more preferably from the initial to middle state of the esterification reaction, then neutralizing the reaction mixture with an amine upon the completion of the reaction, and phase-inversion emulsifying the neutralized mixture together with the acryl-modified epoxy resin. The acryl-modified epoxy resin is a so-called self-emulsifiable epoxy resin obtained by introducing a segment having an emulsifying force into the molecule by modifying an epoxy resin with an acrylic resin. By this method, the aqueous dispersion of the acrylic resin (D) is once dissolved in the organic solvent when added to the solution of the acryl-modified epoxy resin and, thereafter, the aqueous dispersion thus dissolved is phase-inversion emulsified together with the self-emulsifiable acryl-modified epoxy resin, whereby the particles of the acrylic resin (D) can be finely dispersed and the aqueous resin composition containing the acrylic resin (D) having homogeneous particle sizes of from 0.1 to 2.0 μm is easily obtained. Therefore, the particle sizes of the acrylic resin (D) in the aqueous dispersion are not particularly regulated. Although the mechanism has not yet been clarified, it is preferred that the acrylic resin (D) is added to the acryl-modified epoxy resin in the form of an aqueous dispersion wherein the acrylic resin (D) stably exists in water. When the acryl resin, which is not in the form of the aqueous dispersion, is added, it becomes difficult to obtain the inherent performance of the acrylic resin (D).

The coating material using the aqueous resin composition of the invention containing the acrylic resin (D) thus obtained is excellent in the foaming property and the optimization and homogenization of the particle sizes of the acrylic resin (D) occur. Therefore, when a cured coated film is formed by the coating composition, the structure in which the particles of the acrylic resin (D) having particle sizes of from 0.1 to 2 μm are dispersed in the cured coated film can be easily formed. By forming the structure that the particles of the acrylic resin (D) having the above-described particle sizes are dispersed in the cured coated film, the adhesive force and the fracturing property of the coated film upon opening the can end are improved, whereby it becomes possible to obtain both the opening property of the can end and the corrosion resistance of the can end.

The particle sizes of the particles of the acrylic resin (D) means the particle sizes of the acrylic resin (D) in the cured coated film. It is sufficient that the acrylic resin (D) is dispersed in the cured coated film of the acryl-modified epoxy resin with dispersed particle sizes of from 0.1 to 2 μm at the time when the cured coated film is finally formed. There is no particular restriction on the average particle size of the acrylic resin (D) in the aqueous dispersion.

The aqueous resin composition of the invention containing the particles of the acrylic resin (D) can be also prepared by directly adding the aqueous dispersion of the acrylic resin (D) into the aqueous dispersion of the acryl-modified epoxy resin followed by mixing. However, in this case, there is a tendency that foaming of the coating material using the aqueous resin composition is increased. Also, even when the average particle size of the acrylic resin (D) in the aqueous medium is controlled in the range of from 0.1 to 2 μm, relatively large particles of larger than 2 μm exist, and there is a tendency that the cured coated film obtained in this case contains many particles of the acrylic resin (D) dispersed therein having the particle sizes of larger than 2 μm. Furthermore, it is easy to control the average particle size of the acrylic resin (D) in the aqueous medium to not larger than 0.1 μm, but there is a tendency that the particle sizes of the acrylic resin (D) dispersed in the cured coated film become not larger than 0.1 μm. In addition, the average particle size in the aqueous medium is obtained by measuring a light scattering type particle size distribution meter and a median size. In other words, it is substantially difficult with the method of directly adding and mixing to strictly control the particle sizes of the acrylic resin (D) in the cured coated film to the above-described range.

To the aqueous resin composition of the invention, particularly to the aqueous resin composition of the invention used for interior coating of a can end, a phenol resin may be added, as needed, as a curing agent in the range of from 0.1 to 5% for increasing the adhesion and curing property of the coated film. When the addition amount of the phenol resin exceeds 5%, there is an undesirable tendency that curing proceeds too much and the flexibility is deteriorated.

Typical examples of the phenol resin include various tetra-functional phenol compounds such as bisphenol A and bisphenol F; various tri-functional phenol compounds such as carbolic acid, m-ethylphenol, 3,5-xylenol, and m-methoxyphenol; and phenol resins obtained by synthesizing various bifunctional phenols and formaldehyde in the presence of an alkali catalyst, such as p-cresol, o-cresol, p-tert-butylphenol, p-ethylphenol, 2,3-xylenol, and m-methoxyphenol.

Also, a phenol resin, wherein a part or the whole of the methylol group contained therein are etherified with alcohols having from 1 to 12 carbon atoms, can be used.

To the aqueous resin composition of the invention, various additives such as a surface active agent, a defoaming agent, etc., can be added as needed upon the preparation of the coating material therefrom.

The aqueous resin composition of the invention is useful for coating to various metal materials or products of, for example, aluminum, tin-plated steel sheets, pre-treated metals, steels, etc., but as a matter of course, it may be used as a coating agent for other materials and processed products, such as woods, etc.

As a coating method of the coating material using the aqueous resin composition of the invention, various spray coatings such as an air spray, an airless spray, an electrostatic spray, etc.; dip coating, roll coater coating, electrodeposition coating, etc., can be used.

In the case of coating a water-dispersion type coating material by roll coating, particularly in the case of coil coating, the coating material is generally coated at an FC#4 viscosity of about 30 seconds taking into account the picking up property, the flexibility, etc., and the proper C value at the viscosity is in the range of from 0.70 to 0.90. When the C value is less than 0.7, it becomes difficult to insure the coating amount, while when the C value exceeds 0.90, bubbles in a coater pan are enfolded and blisters caused by the bubbles generate on the coated surface.

Also, the baking conditions are preferably in the range of a temperature of from 120 to 280° C. and from 10 seconds to 30 minutes.

The aqueous resin composition of the invention may be blended with each of proper rust preventives, pigments, fillers, etc., depending on uses, and can be used as a rust-preventing primer, a printing ink, a corrosion preventing and rust preventing coating material, and the like.

The most preferred use of the aqueous resin composition of the invention is to use as an interior coating of various metal vessels used for beverages, etc. Because the coated film has a water resistance, does not cause the eluation of low molecular weight compounds from the coated film into the content in the can, and has a very high impermeability of the coated film, a coated article, which does not change the natural taste and flavor of the beverage contained in the inside of the can and also is excellent in the flexibility, is obtained.

Also, when the aqueous resin composition of the invention is used for interior coating of a can, which is the preferred use of the aqueous resin solution, various known waxes, which are lubricants, can be added to the aqueous resin composition for preventing the coated film from being injured at working. The waxes can be as a matter of course used singly but it is more effective to use a hard wax having a penetration at 25° C. of 10 or lower together with a soft wax having a penetration of larger than 10 taking into account the friction and abrasion resistance.

Furthermore, because the aqueous resin composition of the invention does not cause foaming in baking conditions of a high temperature and a short time as well as can give a thick coating and also is excellent in the flexibility and corrosion resistance, the aqueous resin composition is also useful as a coating material for correcting the welded portion of a welded can.

Coated Metal Material

Then, the coated metal material having the cured coated film excellent in corrosion resistance, flexibility and opening property obtained by curing a coating of the above-described aqueous resin composition of the invention on the surface of a metal material is explained below.

As the metal material, various metal materials such as aluminum, tin-plated steel sheets, pre-treated metals, and further steels are used. In particular, a material for a metal can for filling edible beverages is preferably used.

As the coating method for obtaining the coated metal material of the invention, various spray coatings such as air spray coating, air-less spray coating, and an electrostatic spray coating, etc.; dip coating; roll coating; an electrodeposition coating, etc., can be used.

The baking conditions are preferably at a temperature of from 120 to 280° C. and for a period of from 10 seconds to 30 minutes.

The thickness of the coated film is preferably from 10 to 160 mg/dm$^2$.

As the most preferred use, the coated metal material of the invention can be used as metal vessels such as various cans for beverages, etc. Because the coated film has water resistance, does not give the elution of low-molecule compounds from the coated film into the content in the can, and also has a very high impermeability of the coated film, the coated metal material of the invention does not change the natural taste and the flavor of the beverage contained in the coated inside of the can and also is excellent in the flexibility.

In particular, when the coated metal material formed with the coated material using the aqueous resin composition of the invention and having dispersed therein the particles of the acrylic resin (D) of the particle sizes of from 0.1 to 2 μm is used for the inside surface of a can, the coated metal material is excellent in the opening property and the secondary processing corrosion resistance and shows especially excellent performances in the case of filling a beverage having a high corrosive property, such as, for example a high carbonated beverage.

EXAMPLES

The present invention will be illustrated in greater detail with reference to the following Examples, but the invention should not be construed as being limited thereto. In the Examples, all the parts and percentages (%) are by weight unless otherwise indicated.

Example 1

Synthesis of Carboxyl Group-containing Acrylic Resin (C-1)

| | | |
|---|---|---|
| (a) | n-Butanol | 670 parts |
| (b) | Styrene | 250 parts |
| (c) | Ethyl acrylate | 10 parts |
| (d) | Methacrylic acid | 190 parts |
| (e) | Benzoyl peroxide | 10 parts |

First, (a) was placed in a four-neck flask in which the inside atmosphere was replaced with a nitrogen gas, the content was maintained at 110° C. with stirring, and then a mixed solution of (b) to (e) was gradually added dropwise to the content over a period of 2 hours. After finishing the addition of them, the mixture was further stirred for 3 hours at the same temperature to obtain a carboxyl group-containing acrylic resin solution having the solid components of 40%.

Synthesis of Acryl-modified Epoxy Resin and Formation of Aqueous Dispersion Thereof

| | | |
|---|---|---|
| (f) | ZX-1449-8 | 135 parts |
| (g) | Epikote 4010P | 15 parts |
| (h) | Above-described carboxyl group-containing acrylic resin solution (C-1) | 66 parts |
| (i) | n-Butanol | 225 parts |
| (j) | Dimethylethanolamine | 3 parts |
| (k) | Dimethylethanolamine | 5 parts |
| (l) | Ion-exchanged water | 530 parts |

First, (f) to (i) were placed in a four-neck flask in which the inside atmosphere was replaced with a nitrogen gas, after completely dissolving them by stirring the mixture at 110° C. for 2 hours, the solution obtained was cooled to 85° C. To the solution was added (j) followed by stirring for 120 minutes to obtain a solution of an acryl-modified epoxy resin containing a carboxyl group and having self-emulsifiability, said solution having the solid components of 40%, and at the same time, (k) and a part of (1) were added to the solution and the temperature was lowered to substantially stop the esterification reaction, and further, while stirring the solution, the rest of (l) was added dropwise to the solution over a period of 30 minutes, and a phase-inversion emulsification was caused to obtain aqueous dispersion of the acryl-modified epoxy resin having the solid components of 18%. From the measurements of the acid value and the epoxy equivalent, it was confirmed that about 56% of the epoxy group had been reacted in the esterification reaction of 120 minutes.

In addition, ZX-1449-8 used in the above-described reaction is a bisphenol A-type epoxy resin having a number average molecular weight of 13000 and an epoxy equivalent of 8500, manufactured by Toto Kasei K.K., and also Epikote 4010P is a bisphenol F-type epoxy resin having a number average molecular weight of 6000 and an epoxy equivalent of 4100 manufactured by Yuka Shell Epoxy Corporation. Furthermore, n-butanol and water were distilled off by an azeotropic distillation under a reduced pressure to obtain an aqueous dispersion of an acryl-modified epoxy resin without containing a solvent and having a non-volatile component of 37%. Moreover, a coating material was formed by the following formulation, the viscosity was controlled with dimethylethanolamine such that the FC#4 viscosity thereof at 25° C. became 30 seconds to obtained a coating material having the non-volatile components of 32%.
Formation of Coating Material

| | | |
|---|---|---|
| (m) | Above-described aqueous dispersion | 90 parts |
| (n) | Butyl carbitol | 8 parts |
| (o) | Ion-exchanged water | 6 parts |

Example 2

By following the same procedure as Example 1 except that the ratio of the aromatic epoxy resins (A) and (B) was changed, a partial esterification reaction was carried out to obtain an aqueous dispersion and then by the same manner as in Example 1, a coating material was obtained.

Example 3

By following the same procedure as Example 1 except that Epikote 1010, which was a bisphenol A-type epoxy resin having the number average molecular weight of 6800 and an epoxy equivalent of 3900 manufactured by Yuka Shell Epoxy Corporation, was used in place of the aromatic epoxy resin (B) in Example 2, a partial esterification reaction was carried out to obtain an aqueous dispersion and then by the same manner as in Example 1, a coating material was obtained.

Example 4
Synthesis of Acrylic Resin (D-1)

| | | |
|---|---|---|
| (a) | Above-described carboxyl group-containing acrylic resin solution | 50 parts |
| (b) | Dimethylethanolamine | 4 parts |
| (c) | Ion-exchanged water | 258 parts |
| (d) | Styrene | 10 parts |
| (e) | Ethyl acrylate | 170 parts |
| (f) | t-Butylperoxy 2-ethylhexanoate | 6 parts |
| (g) | n-Butanol | 2 parts |

First, (a) to (c) were placed in a four-neck flask in which the inside atmosphere was replaced with a nitrogen gas, the mixture was maintained at 80° C. while dissolving by stirring, and a mixed solution of (d) to (g) was gradually added dropwise to the solution over a period of 2 hours. After finishing the addition, the mixture was stirred at the same temperature for 3 hours to obtain an aqueous dispersion of an acrylic resin having the solid components of 40%.
Synthesis of Acryl-modified Epoxy Resin and Formation of Aqueous Dispersion Thereof

| | | |
|---|---|---|
| (f) | ZX-1449-8 | 135 parts |
| (g) | Epikote 4010P | 15 parts |
| (h) | Above-described carboxyl group-containing acrylic resin solution | 66 parts |
| (i) | n-Butanol | 225 parts |
| (j) | Dimethylethanolamine | 3 parts |
| (k) | Dimethylethanolamine | 5 parts |
| (l) | Ion-exchanged water | 530 parts |
| (m) | Above-described acrylic resin (D-1) | 44 parts |

First, (f) to (i) were placed in a four-neck flask in which the inside atmosphere was replaced with a nitrogen gas, and after stirring the mixture at 110° C. for 2 hours to completely dissolve, the solution obtained was cooled to 85° C. To the solution were added (j) and (m) followed by stirring for 160 minutes to obtain an acryl-modified epoxy resin solution, and at the same time, (k) and a part of (1) were added to the solution, when the temperature was lowered to substantially stop the esterification reaction, the rest of (1) was added dropwise thereto over a period of 30 minutes, and a phase-inversion emulsification was caused to obtain an aqueous dispersion of the acryl-modified epoxy resin having the solid components of 18%. From the measurements of the acid value and the epoxy equivalent, it was confirmed that about 52% of the epoxy group had been reacted in the esterification reaction of 120 minutes.

Furthermore, n-butanol and water were distilled off by an azeotropic distillation under a reduced pressure to obtain an aqueous dispersion of an acryl-modified epoxy resin without containing a solvent and having the non-volatile component of 37%. Moreover, a coating material was formed by the following formulation, the viscosity was controlled with dimethylethanolamine such that the FC#4 viscosity thereof at 25° C. became 30 seconds to obtained a coating material having the non-volatile components of 32%. Formation of Coating Material

| | | |
|---|---|---|
| (n) | Above-described aqueous dispersion | 90 parts |
| (o) | 7700LB | 1 part |
| (p) | Butyl carbitol | 8 parts |
| (q) | Ion-exchanged water | 5 parts |

In this case, 7700LB used is a phenol resin having non-volatile components of 70% manufactured by Bakelite AG Corporation.

Example 5

By following the same procedure as Example 4 except that the ratio of the aromatic epoxy resins (A) and (B) of Example 4, a partial esterification reaction was carried out to obtain an aqueous dispersion, and thereafter a coated material was obtained by the same manner as in Example 4.

Example 6

By following the same procedure as Example 5 except that Epikote 1010 was used in place of the aromatic epoxy resin, Epikote 4010P of Example 5, a partial esterification reaction was carried out to obtained an aqueous dispersion, and thereafter a coated material was obtained by the same manner as in Example 4.

Example 7
Synthesis of Acrylic Resin (d-3)

| | | |
|---|---|---|
| (a) | Above-described carboxyl group-containing acrylic resin solution | 50 parts |
| (b) | Dimethylethanolamine | 4 parts |
| (c) | Ion-exchanged water | 258 parts |
| (d) | Styrene | 80 parts |
| (e) | Ethyl acrylate | 100 parts |
| (f) | t-Butylperoxy 2-ethylhexanoate | 6 parts |
| (g) | n-Butanol | 2 parts |

First, (a) to (c) were placed in a four-neck flask in which the inside atmosphere was replaced with a nitrogen gas, the mixture was maintained at 80° C. while dissolving by stirring, and a mixed solution of (d) to (g) was gradually added dropwise to the solution over a period of 2 hours. After finishing the addition, the mixture was stirred at the same temperature for 3 hours to obtain an aqueous dispersion of an acrylic resin having the solid components of 40%.

Then, by following the same procedure as Example 4 except that the acrylic resin (d-3) was used in place of the acrylic resin (D-1) of Example 4, a partial esterification reaction was carried out to obtained an aqueous dispersion, and thereafter, a coating composition was obtained by the same manner as in Example 4.

Example 8
Synthesis of Acrylic Resin (D-2)

| | | |
|---|---|---|
| (a) | Sodium dioctylsulfosuccinate | 1 part |
| (b) | Ion-exchanged water | 420 parts |
| (c) | Dimethylethanolamine | 3 parts |
| (d) | Styrene | 4 parts |
| (e) | Ethyl acrylate | 96 parts |
| (f) | Ammonium persulfate | 1 part |
| (g) | t-Butylperoxy 2-ethylhexanoate | 2 parts |

First, (a) and (b) were placed in a four-neck flask in which the inside atmosphere was replaced with a nitrogen gas, and the mixture was maintained at 80° C. while dissolving by stirring, and to the solution a part of the mixed solution of (c) to (e) and (f) were added followed by stirring for 30 minutes. Furthermore, the rest of the mixed solution of (c) to (e) and (g) were gradually added dropwise to the mixture over a period of 2 hours. After finishing the addition, the resultant mixture was further stirred at the same temperature for 3 hours to obtain an aqueous dispersion of an acrylic resin having the solid component of 40%. Then, by following the same procedure as Example 4 except that the acrylic resin (D-2) was used in place of the acrylic resin (D-1) of Example 4, a partial esterification reaction was carried out to obtain an aqueous dispersion, and thereafter, a coating material was obtained by the same manner as in Example 4.

Example 9
Synthesis of Acryl-modified Epoxy Resin and Formation of Aqueous Dispersion Thereof

| | | |
|---|---|---|
| (a) | ZX-1449-8 | 135 parts |
| (b) | Epikote 4010P | 15 parts |
| (c) | Above-described carboxyl group-containing acrylic resin solution | 66 parts |
| (d) | n-Butanol | 225 parts |
| (e) | Dimethylethanolamine | 3 parts |
| (f) | Dimethylethanolamine | 5 parts |
| (g) | Ion-exchanged water | 530 parts |

First, (a) to (d) were placed in a four-neck flask in which the inside atmosphere was replaced with a nitrogen gas, and after stirring the mixture at 110° C. for 2 hours to completely dissolve, the solution obtained was cooled to 85° C. To the solution was added (e) followed by stirring for 120 minutes to obtain an acryl-modified epoxy resin solution, and at the same time, (f) and a part of (g) were added to the solution and the temperature was lowered to substantially stop the esterification reaction. While further stirring the reaction mixture, the rest of (g) was added dropwise thereto over a period of 30 minutes and a phase-inversion emulsification was carried out to obtain an aqueous dispersion of the acryl-modified epoxy resin having the solid components of 18%. From the measurements of the acid value and the epoxy equivalent, it was confirmed that about 54% of the epoxy group had been reacted in the esterification reaction of 120 minutes.

Furthermore, n-butanol and water were distilled off by an azeotropic distillation under a reduced pressure to obtain an aqueous dispersion of an acryl-modified epoxy resin without containing solvent and having the non-volatile component of 37%. Moreover, (h) to (k) were mixed by the following formulation followed by sufficiently mixing and a coating material was formed by adding (1), and the viscosity was controlled with dimethylethanolamine such that the FC#4 viscosity thereof at 25° C. became 30 seconds to obtained a coating material having the non-volatile components of 32%.

Formation of Coating Material

| | | |
|---|---|---|
| (h) | Above-described aqueous dispersion | 90 parts |
| (i) | 7700LB | 1 part |
| (j) | Butyl carbitol | 8 parts |
| (k) | Ion-exchanged water | 5 parts |
| (l) | Above-described acrylic resin (D-2) | 8 parts |

Example 10

By following the Example 4 except that the addition amount of the acrylic resin (D-1) used in Example 4, a partial esterification reaction was carried out to obtain an aqueous dispersion for contrast, and thereafter, a coating material was obtained by the same manner as in Example 4.

COMPARATIVE EXAMPLE 1

By following the same procedure as Example 4 except that the aromatic epoxy resin (B-1) used in Example 1 was not used, a partial esterification reaction was carried out to obtain an aqueous dispersion for contrast and thereafter, a coating material was obtained by the same manner as in Example 1.

COMPARATIVE EXAMPLE 2

By following the same procedure as Example 2 except that the an aromatic epoxy resin having a large epoxy equivalent in place of the aromatic epoxy resin B used in Example 2, a partial esterification reaction was carried out to obtain an aqueous dispersion for contrast and thereafter, a coating material was obtained by the same manner as in Example 2. The aromatic epoxy resin having a large epoxy equivalent used herein was a bisphenol F-type epoxy resin having a number average molecular weight of 7500 and an epoxy equivalent of 7800 manufactured by Yuka Shell Epoxy Corporation.

COMPARATIVE EXAMPLE 3

By following the same procedure as Example 1 except that the aromatic epoxy resin (B-2) used in Example 1 only was used, a partial esterification reaction was carried out to obtain an aqueous dispersion for contrast and thereafter, a coating material was obtained by the same manner as in Example 1.

COMPARATIVE EXAMPLE 4

By following the same procedure as Example 1 except that a carboxyl group-containing acrylic resin synthesized similarly by the ratios shown below was used in place of the carboxyl group-containing acrylic resin used in Example 1, a partial esterification reaction was carried out to obtain an aqueous dispersion for contrast and thereafter, a coating material was obtained by the same manner as in Example 1.
Synthesis of Carboxyl Group-containing Acrylic Resin (c-2)

| | | |
|---|---|---|
| (a) | n-Butanol | 670 parts |
| (b) | Styrene | 110 parts |
| (c) | Ethyl acrylate | 150 parts |
| (d) | Methacrylic acid | 190 parts |
| (e) | Benzoyl peroxide | 10 parts |

Then, each of the coating materials obtained in Examples 1 to 10 and Comparative Examples 1 to 4 was evaluated by the following evaluation methods and the results are shown in Table 3 and Table 4.

Preparation of Coated Sheet for Test

Each of the coating materials obtained in the examples and the comparative examples was coated on an aluminum sheet of 5182 material having a thickness of 0.26 mm at a dry thickness of 120 mg/dm$^2$ by using a bar coater, and after baking the coated sheet under an oven condition that PMT became 250° C. at an over passing time of 23 seconds, the coated sheet was cooled to provide a coated sheet for test.

Adhesion

On each coated film formed on the coated sheet for test were formed 100 meshes each of 1 mm×1 mm by a cutter and each test piece was subjected hot water process at 125° C. for 30 minutes. Then, after sticking a pressure-sensitive adhesive tape onto the meshed portions, the pressure-sensitive adhesive tape was quickly peeled off, the peeling state of the coated film was observed, and the state was evaluated by the following four grades.

A—No peeling.
B—1 to 2% of the whole were peeled off.
C—3 to 10% of the whole were peeled off.
D—11 to 100% of the whole were peeled off.

Flexibility

Using each of the coated sheets for test, an end-producing work was carried out at a pressing temperature of 20° C. For determining the extent of the injury of the coated film after working, using an enamel rater (electric current tester), about the coated surface of the end, the electric current value was measured via an electrolyte of an aqueous 1% sodium chloride solution and the flexibility was evaluated by the following four grades.

A—The electric current value is less than 0.1 mA.
B—The current value is at least 0.1 mA and less than 0.5 mA.
C—The current value is at least 0.5 mA to less than 5 mA.
D—The current value is at least 5 mA.

Consumed Amount of KMnO$_4$

In 100 ml of purified water was immersed the above-described was coated sheet of 160 cm$^2$, after applying a hot water process at 125° C. for 0.5 hour, the consumed amount of potassium permanganate, and the consumed amount was evaluated by the following four grades.

A—The consumed amount is less than 3 ppm.
B—The consumed amount is at least 3 ppm and less than 5 ppm.
C—The consumed amount is at least 5 ppm and less than 10 ppm.
D—The consumed amount is at least 10 ppm.

Opening Property

After applying a hot water process to each end produced by the end-producing work as in the flexibility test described above at 100° C. for 10 minutes, the tab of the end was pulled up, and the remaining film width of the coated film of the inside surface of the opened portion at opened was evaluated by the following four ranks.

A—The remaining film width is less than 0.2 mm.
B—The remaining film width is at least 0.2 mm and less than 0.4 mm.
C—The remaining film width is at least 0.4 mm and less than 0.6 mm.
D—The remaining film width is at least 0.6 mm.

Secondary Processing Corrosion Resistance

After filling a test liquid in each can of 350 ml at a low temperature, the end of the end-producing worked as described above was tightened by winding and after once heating the can to 60° C., each can was stored for one month at 37° C. Thereafter, 20 cans were opened, the inside surface side of the end was observed, and the presence or absence of corrosion was evaluated by the following four grade. In addition, as the test liquid, (1) an aqueous 0.1% sodium chloride solution having a relatively weak corrosive property, (2) an aqueous solution of 0.5% citric acid +0.5% sodium chloride having a corrosive property of an intermediate extent, or (3) an aqueous solution of 5% citric acid +5% malic acid +5% sodium chloride having a very strong corrosive property was used.

A—No corrosion is observed on all the ends.
B—There is a case that small corrosions are observed on a part of the ends.
C—Small corrosions are always observed on all the ends.
D—Much corrosions are observed on all the ends.

Flavor Test

Both the inner and outer surfaces of each of the aluminum sheet were coated with each of the coating material at a dry coating weight of 120 mg/cm$^2$ by using a bar coater and the coated sheet was baked under the same condition to provide a coated sheet for test. After placing the coated sheet for test having a surface area of 500 cm$^2$ in glass jar of 500 ml and filling a sport drink in the glass jar at a low temperature, the glass jar was once heated to 75° C., and the jar was shaded and stored for one month at 37° C. Also, a blank without containing the coated sheet was prepared for comparative contrast. The maintenance of the flavor of the sport drink was evaluated by the following four grades.

A—No difference is seen as compared with the comparative contrast.

B—The deterioration of the flavor is slightly seen as compared with the comparative contrast.

C—The deterioration of the flavor is seen as compared with the comparative contrast.

D—The deterioration of the flavor is greatly seen as compared with the comparative contrast.

Flow Characteristics

After forming each coating material, the viscosity between 10 to 1000 as the shear rate was measured by a CSL-100 rheometer manufactured by Cary Med Corporation, by substituting the value for the Harshal-Barkley's approximate formula relating to the flow characteristics, the coefficient C, which became the index of a pseudo-plasticity flow, was obtained, and the flow characteristics were evaluated by the following four stages. Because the C value is influenced by the viscosity measured by FC#4, since the optimum FC viscosity at coil coating is generally about 30 seconds, it is necessary to measure the C value at the FC viscosity of 30 seconds (25° C.). As a matter of course, in the case of a Newtonian fluid, there is not such an influence. However, in the case of a pseudo-plasticity fluid there is a tendency that when the FC viscosity is high, the C value is lowered and when the FC viscosity is low, the C value is high. Therefore, it is necessary to evaluate by fixing the FC viscosity.

A—The C value is at least 0.75 and less than 0.85.

B—The C value is at least 0.70 and less than 0.75 or is at least 0.85 and less than 0.90.

C—The C value is at least 0.65 and less than 0.70, or is at least 0.90 and less than 0.95.

D—The C value is less than 0.65 or is at least 0.95.

TABLE 1

| | Example | | | | | | |
|---|---|---|---|---|---|---|---|
| | 1 | 2 | 3 | 4 | 5 | 6 | 7 |
| Aromatic epoxy resin (A) MN: 13000, WPE: 8500 (Bisphenol A-type epoxy resin) | 90 | 80 | 80 | 90 | 80 | 80 | 90 |
| Aromatic epoxy resin (B-1) MN: 6800, WPE: 3900 (Bisphenol A-type epoxy resin) | | 20 | | | 20 | | |
| Aromatic epoxy resin (B-2) MN: 6000, WPE: 4100 (Bisphenol F-type epoxy resin) | 10 | 20 | | 10 | 20 | | 10 |
| Aromatic epoxy resin (b-3) MN: 7500, WPE: 7800 (Bisphenol F-type epoxy resin) | | | | | | | |
| Carboxyl group-containing acrylic resin (C-1) Theoretical Tg: at least 100° C. | 18 | 18 | 18 | 18 | 18 | 18 | 18 |
| Carboxyl group-containing acrylic resin (c-2) Theoretical Tg: lower than 100° C. | | | | | | | |
| Acrylic resin (D-1) Tg: -3° C. | | | | | 10 | 10 | 10 |

TABLE 1-continued

| | Example | | | | | | |
|---|---|---|---|---|---|---|---|
| | 1 | 2 | 3 | 4 | 5 | 6 | 7 |
| Acrylic resin (D-2) Tg: -19° C. | | | | | | | |
| Acrylic resin (d-3) Tg: 40° C. | | | | | | | 10 |
| Acrylic resin diameter (μm) in the coated film | | | | 1.0 | 1.0 | 1.0 | 1.0 |

TABLE 2

| | Example | | | Comparative Example | | | |
|---|---|---|---|---|---|---|---|
| | 8 | 9 | 10 | 1 | 2 | 3 | 4 |
| Aromatic epoxy resin (A) MN: 13000, WPE: 8500 (Bisphenol A-type epoxy resin) | 90 | 90 | 90 | 100 | 80 | | 90 |
| Aromatic epoxy resin (B-1) MN: 6800, WPE: 3900 (Bisphenol A-type epoxy resin) | | | | | | | |
| Aromatic epoxy resin (B-2) MN: 6000, WPE: 4100 (Bisphenol F-type epoxy resin) | 10 | 10 | 10 | | | 100 | 10 |
| Aromatic epoxy resin (b-3) MN: 7500, WPE: 7800 (Bisphenol F-type epoxy resin) | | | | | 20 | | |
| Carboxyl group-containing acrylic resin (C-1) Theoretical Tg: at least 100° C. | 18 | 18 | 18 | 18 | 18 | 18 | |
| Carboxyl group-containing acrylic resin (c-2) Theoretical Tg: lower than 100° C. | | | | | | | 18 |
| Acrylic resin (D-1) Tg: -3° C. | | | 30 | | | | |
| Acrylic resin (D-2) Tg: -19° C. | 10 | 10 | | | | | |
| Acrylic resin (d-3) Tg: 40° C. | | | | | | | |
| Acrylic resin diameter (μm) in the coated film | 3.0 | 0.01 | 1.0 | | | | |

TABLE 3

| | Example | | | | | | |
|---|---|---|---|---|---|---|---|
| | 1 | 2 | 3 | 4 | 5 | 6 | 7 |
| Adhesion | A | A | A | A | A | A | A |
| Flexibility | A | A | A | A | A | A | A |
| KMnO₄ Consumed amount | A | A | A | A | A | A | A |
| Opening property (Secondary processing corrosion resistance) | A | A | A | A | A | A | B |
| (1) Aqueous 0.1% NaCl solution | A | A | A | A | A | A | A |
| (2) Aqueous solution of 0.5% citric acid + 0.5% NaCl | B | B | B | A | A | A | B |
| (3) Aqueous soln. of 0.5% citric acid + 0.5% malic acid + 0.5% NaCl | C | C | C | A | A | A | C |
| Flavor test | A | A | A | A | A | A | A |
| Flow characteristics | A | A | A | A | A | A | A |

TABLE 4

|  | Example | | | Comparative Example | | | |
| --- | --- | --- | --- | --- | --- | --- | --- |
|  | 8 | 9 | 10 | 1 | 2 | 3 | 4 |
| Adhesion | A | C | C | B | A | A | A |
| Flexibility | C | A | C | A | A | D | C |
| KMnO₄ Consumed amount | A | A | A | A | A | C | A |
| Opening property (Secondary processing corrosion resistance) | A | C | C | D | A | A | B |
| (1) Aqueous 0.1% NaCl solution | A | A | A | B | C | D | B |
| (2) Aqueous solution of 0.5% citric acid + 0.5% NaCl | A | A | A | C | D | D | C |
| (3) Aqueous soln. of 0.5% citric acid + 0.5% malic acid + 0.5% NaCl | A | A | A | D | D | D | D |
| Flavor test | A | A | A | A | A | B | C |
| Flow characteristics | A | A | A | C | D | C | A |

When the aqueous resin composition of the present invention is used for, particularly, a coating on the inside surface of a can, or the inside surface of the can end, the possibility of causing a fire and an environmental pollution is less, a general stable hygiene, the adhesion of the coated film, and flexibility after hot water process are good and, in addition, the secondary processing corrosion resistance and the opening property are excellent, as well as a proper coating material flowability can be obtained, the aqueous resin composition of the invention of greatly excellent as the coating agent used for food vessels.

While the invention has been described in detail and with reference to specific examples thereof, it will be apparent to one skilled in the art that various changes and modifications can be made therein without departing from the spirit and scope thereof.

What is claimed is:

1. An aqueous resin composition prepared by a process comprising the steps of:

reacting epoxy resin comprising: (A) an aromatic epoxy resin having a number average molecular weight of at least 9,000 and an epoxy equivalent of not larger than 9,000; and (B) an aromatic epoxy resin having a number average molecular weight of less than 9,000 and an epoxy equivalent of not larger than 5,000 and (C) a carboxyl group-containing acrylic resin having a glass transition temperature of at least 100 ° C., to undergo partial-esterification to obtain an acryl-modified epoxy resin;

neutralizing said acryl-modified epoxy resin with a base; and dispersing said neutralized acryl-modified epoxy resin in an aqueous medium.

2. The aqueous resin composition according to claim 1, wherein said aromatic epoxy resin (A) is a bisphenol A epoxy resin or a bisphenol B epoxy resin, and said aromatic epoxy resin (B) is a bisphenol F epoxy resin.

3. The aqueous resin composition according to claim 1, wherein said aromatic epoxy resin (A) is a bisphenol A epoxy resin or a bisphenol B epoxy resin, and said aromatic epoxy resin (B) is a bisphenol A epoxy resin or a bisphenol B epoxy resin.

4. The aqueous resin composition according to claim 1, having a content ratio of said aromatic epoxy resin (A) to said aromatic epoxy resin (B) of from 95/5 to 75/25 by weight.

5. The aqueous resin composition according to claim 1, wherein said carboxyl group-containing acrylic resin (C) has a number average molecular weight of from 2,000 to 10,000.

6. The aqueous resin composition according to claim 1, wherein the weight ratio (((A)+(B))/(C)), in terms of non-volatile components, of said aromatic epoxy resin (A) and said aromatic epoxy resin (B) to said carboxyl group-containing acrylic resin (C) is from 80/20 to 90/10.

7. The aqueous resin composition according to any one of claims 1 to 6, further comprising particles of an acrylic resin (D) having a glass transition temperature of not higher than 0° C. and being incompatible with said acryl-modified epoxy resin.

8. The aqueous resin composition according to claim 7, having a content ratio of said acryl-modified epoxy resin to said particles of acrylic resin (D) of from 99/1 to 80/20 by weight.

9. A coated metal material comprising a metal material having on the surface thereof a cured film formed by curing a coating of an aqueous resin composition according to claim 1.

10. The coated metal material according to claim 9, wherein said cured coated film has dispersed particles of an acrylic resin (D) having a glass transition temperature of not higher than 0° C. and being incompatible with said acryl-modified epoxy resin, said dispersed particles having an average particle size of from 0.1 to 2.0 μm.

* * * * *